United States Patent Office 3,475,047
Patented Oct. 28, 1969

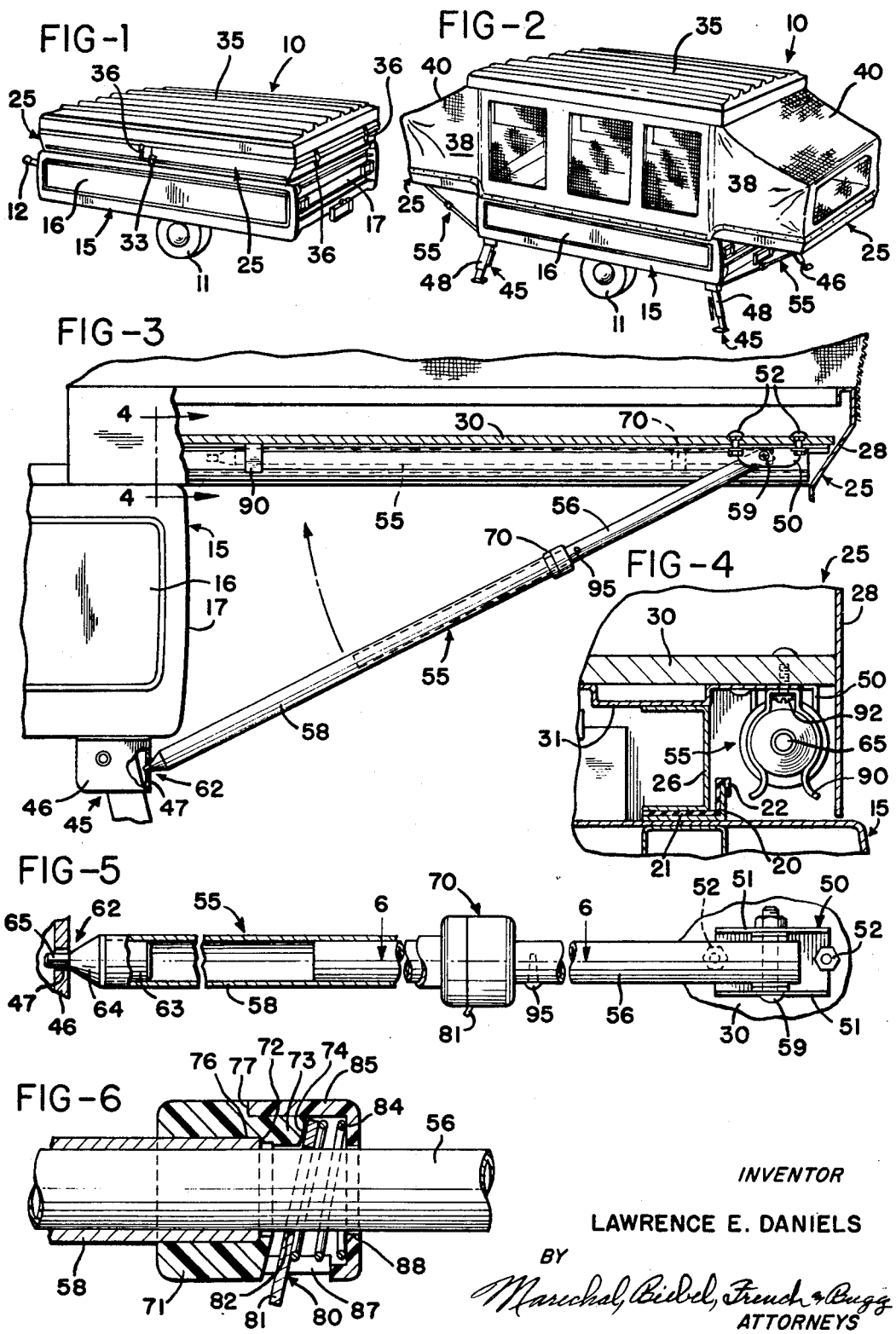

3,475,047
CAMPING TRAILER WITH RETRACTABLE BED BRACES
Lawrence E. Daniels, Florence, Ky., assignor to Ward Manufacturing, Inc., Hamilton, Ohio, a corporation of Ohio
Filed June 1, 1967, Ser. No. 642,957
Int. Cl. B60p 3/34
U.S. Cl. 296—23                                    6 Claims

ABSTRACT OF THE DISCLOSURE

In a camping trailer having a body supporting a pair of beds movable horizontally between retracted and extended positions, each bed has a set of telescopically adjustable braces each pivotable between a retracted position adjacent the underneath surface of the bed and a downwardly extending position for engaging a member rigidly connected to the body.

BACKGROUND OF THE INVENTION

In camping trailers having a two-wheeled chassis supporting a generally rectangular shaped body, it is common to mount a pair of beds on the body so that the beds slide horizontally between a retracted position directly above the body for storing and towing the trailer and an extended position for using the beds and trailer body at a camp site. Usually some form of collapsible cover is erected over the beds and the body to provide a protected living and sleeping area.

When the beds are extended in a cantilevered position, it is desirable to brace the outer portion of each bed so that it can easily support substantial weight without sagging or bending. Usually each bed is braced by a pair of metal tubes extending from the outermost corners of the bed downwardly to the ground or the base of the trailer body. Commonly each corner of each bed is provided with a removable brace which is stored within the body when the trailer is collapsed and set in position after the beds are extended. Another type of brace is one which has one end pivotally connected to the bottom surface of the body so that each brace can be moved between a stored position under the body and its supporting position where the opposite end engages the corresponding outer corner of the bed.

It has been found that the removable braces are easily lost or left at a camp site by forgetting to place the braces within the body when the trailer is being collapsed. Furthermore, the removable braces are awkward to handle and require significant time to set in position and remove during extending and collapsing the trailer. On the other hand, the braces which are pivotally mounted on the lower portion of the body and are stored under the body collect dirt from the road and are easily bent or damaged.

SUMMARY OF THE INVENTION

The present invention is directed to a camping trailer as described above wherein the braces for each bed are permanently mounted on the undernearth surface of the bed and are each pivotable between a retracted position where the brace extends adjacent the bed and a downwardly sloping position where the lower end of each brace is supported by a member rigidly connected to the trailer frame. Thus when the trailer is being towed, the braces for each bed are stored within the trailer under the bed and are thereby protected from road dirt and water spray. After the beds are extended, however, the braces of each bed are simply pivoted downwardly from the bed and connected to the trailer frame.

The above features are accomplished in accordance with a preferred embodiment of the invention by pivotally mounting a brace on the underneath side of each outer corner of the bed. Each brace includes a set of telescopic sections and a releasable one-way gripping device which locks the brace sections together at any infinite point of extension of one section relative to the other. Thus after each bed is extended, the corresponding braces are released from spring clips which retain them in their stored position and are then lowered and extended to insert the lower end portion of each brace into a hole formed within a support bracket of a corresponding stabilizing jack mounted on the bottom corner of the body.

BRIEF DESCRIPTION OF THE DRAWING

FIG. 1 is a perspective view of a camping trailer constructed in accordance with the invention and showing the trailer in its collapsed condition;

FIG. 2 is a perspective view of the trailer shown in FIG. 1 with the beds and top extended and illustrating the supporting positions of the bed braces;

FIG. 3 is a fragmentary elevational view of the trailer with a bed extended and with a portion of the bed broken away to show the retracted and supporting positions of a bed brace;

FIG. 4 is an enlarged section taken generally along the line 4—4 of FIG. 3;

FIG. 5 is a bottom view of the bed brace shown in FIG. 3 and with a portion broken away; and FIG. 6 is an enlarged fragmentary section on the line 6—6 of FIG. 5.

DESCRIPTION OF A PREFERRED EMBODIMENT

The camping trailer 10 in FIGS. 1 and 2 include a chassis comprising a frame (not shown) supported by a pair of wheels 11 and having a tow bar 12 adapted to be coupled to a hitch mounted on a towing vehicle. A generally rectangular body 15 is mounted on the chassis and includes parallel spaced side panels 16 and end panels 17.

A pair of longitudinally extending angle tracks 20 (FIG. 4) are mounted on the upper surface of the body 15 and are spaced in parallel relation adjacent the top of the side panels 16 of the body. A low friction plastic angle strip 21 lines each of the tracks 20 and includes a portion 22 which extends over and grips the upper edge of the track 20. A pair of rectangular beds 25 are supported by the body 15, and each bed includes a pair of parallel spaced support channels 26 (FIG. 4) which are slidably supported by the corresponding tracks 20. The inner end portions of the channels 26 slides under retaining brackets (not shown) so that the beds are held horizontally while they are moved from a retracted position (FIG. 1) to an extended position (FIG. 2).

Each of the beds 25 includes an outer sheet metal wall 28 extending along both ends and outer side of a rectangular plywood platform 30 which rests upon and is secured to reinforcing battens 31 mounted on the upper flanges of the channels 26. Preferably, a foam rubber mattress (not shown) is placed on each of the platforms 30. When the beds are retracted (FIG. 1), they are fastened together on opposite sides of the trailer by a pair of toggle clamps 33.

A substantially rigid top 35 having a rectangular configuration corresponding to the configuration of the body, extends over the beds 25 when they are retracted and is secured to the beds by a series of toggle clamps 36. The top 35 is connected to the beds 25 by a pair of U-shaped bows (not shown) which are pivotally mounted on opposite end portions of the top and have ends pivotally connected to the inner corners of the corresponding beds. Thus when the toggle clamps 33 and 36 are released and the beds are extended, the top 35 moves simultaneously to an elevated position as shown in FIG. 2.

Flexible material such as canvas 38 is permanently connected to the periphery of the top 35 and is attached to the wall 28 of each bed and the side panels 16 of the body. The canvas is extended above the beds 25 by suitable bows to form the tent portions 40 which provide covered space above the beds. While a collapsible cover including the rigid top 35 is illustrated in FIGS. 1 and 2, it is to be understood that other cover means be used, as for example, a cover which is constructed entirely of canvas and which is erected after or while the beds are extended by uprighting suitable bows.

Stabilizing supports 45 are mounted on the lower corners of the body 15, and each support includes a U-shaped mounting bracket 46 (FIG. 3) which is provided with a hole 47. A leg 48 is pivotably mounted on the bracket 46 for movement from a retracted position extending adjacent the underneath surface of the body to a downwardly and outwardly extending position (FIG. 2) after a camping site is reached to prevent rocking and tipping of the trailer.

An inverted U-shaped bracket 50 (FIGS. 3 and 4) having parallel spaced flanges 51 is mounted on each outer corner of each platform 30 between the outer wall 28 and the adjacent support channel 26. Each bracket 50 is secured to the platform by a pair of carriage bolts 52 which extend through aligned holes formed in the batten 31 and platform 30 and through notches formed within the ends of the bracket 50.

An elongated brace 55, including a tubular section 56 telescopically received within a slightly larger tubular section 58, is pivotably connected to each of the brackets 50 by a bolt 59 extending through aligned holes formed within an end portion of the brace section 56 and the flanges 51 of the bracket 50. A plug 62 includes a cylindrical portion 63 which is press fitted into an end portion of the brace section 52 and includes a tapered portion 64 from which projects a cylindrical tip portion 65.

Referring to FIGS. 5 and 6, a gripping device 70 includes a cylindrical body portion 71 mounted on the opposite end portion of the brace section 58 which seats against an internal shoulder 72. The body portion 71 includes an axially projecting stud 73 which has a curved surface 74, and further includes a part cylindrical surface 76 forming a shoulder 77. The surface 74 forms a seat for a flat gripping plate 80 having a projecting tab 81 and a circular opening 82 which is slightly larger in diameter than the brace section 56.

A compression spring 84 is retained by a cylindrical body portion 85 which seats on the surface 76 against the shoulder 77. The body portion 85 includes a slot 87 from which the tab 81 projects and is provided with a circular opening 88 slightly larger in diameter than the tube section 56. The spring 84 biases the plate 80 against the surface 74 which causes the plate to tilt or cant for gripping the brace section 56 and thereby prevents the brace sections from telescoping together when an axial compression force is exerted on the brace. When the brace section 58 is extended, however, the plate 80 moves towards a normal position in relation to the axis of the tube sections and thereby releases the tube section 56.

A U-shaped spring retaining clip 90 is mounted by a screw 92 on the underneath surface of the platform 30 for each of the braces 55 and is spaced between the outer wall 28 and channel 26 close to the opposite side of the bed from where the bracket 50 is mounted. As illustrated in FIG. 4, the section 58 of each brace 55 is inserted within the corresponding spring clip 90 for retaining the brace in a horizontally retracted position adjacent the underneath surface of the platform 30.

After each bed is moved to its extended position, each brace is released from its retaining clip 90 and lowered to a sloping position as shown in FIG. 3. The brace section 58 is then extended until the tip portion 65 of the plug 62 is inserted within the opening 47 within the bracket 46 of the corresponding stabilizing support 45. The one-way gripping device 70 automatically locks the tubular sections 56 and 58 of the brace 55 and thereby produces a rigid brace which supports or braces the outer corresponding corner of the extended bed 25.

When it is desired to lower the top 35 and retract the beds 25, each brace 55 is first released simply by pressing the tab 81 of each gripping device 70 and sliding the brace section 58 further onto the section 56 until the device 70 engages the stop screw 95 mounted on the tube section 56. Each brace 55 is then raised and snapped into its retaining clip 90 after which the beds 25 are moved to the retracted positions as shown in FIG. 1.

From the drawing and the above description, it can be seen that a camping trailer constructed in accordance with the present invention provides several desirable features and advantages. Thus by constructing each brace with telescopic sections and a one-way locking device 70, and by pivotally mounting one end portion of the brace on the underneath side of a bed, the braces for each bed may be quickly moved from their stored position adjacent the bed to a downwardly sloping extended position where the tip portion of each brace engages the corresponding bracket 46 mounted adjacent an outer corner of the bed.

In addition, the braces 55 are conveniently stored on the underneath side of the bed when the beds are retracted so that the braces are not exposed to road dirt and water during traveling. Furthermore, since the braces 55 are permanently connected to beds by the corresponding brackets 50 and bolts 59, there is no chance of losing a brace by forgetting to load the brace within the trailer when the trailer is being collapsed in preparation for traveling. Additionally, since these braces are infinitely adjustable over a substantial range, they lose none of their effectiveness through wear and always provide a firm bracing action.

While the form of apparatus herein described constitutes a preferred embodiment of the invention, it is to be understood that the invention is not limited to this precise form of apparatus, and that changes may be made therein without departing from the scope of the invention.

What is claimed is:

1. A camping trailer or vehicle, comprising a body, at least one horizontally disposed bed mounted on said body for lateral movement generally horizontally between retracted and extended positions relative to said body, at least one elongated brace having first and second end portions, pivot means connecting said first end portion of said brace to the underneath surface of said bed adjacent the outer edge portion of said bed and providing for pivotable movement of said brace between a retracted position extending generally parallel to and adjacent the underneath surface of said bed and a downwardly sloping position relative to said bed, means connected to said body for supporting said second end portion of said brace, and means secured to the underneath surface of said bed for retaining said brace in said retracted position for conveniently storing said brace when said bed is moved horizontally to said retracted position.

2. A camping trailer as defined in claim 1 wherein said brace includes a first tubular section and a second tubular section in telescopic relation, and means for releasably locking said sections together to support a longitudinally compressive force without collapsing.

3. A camping trailer as defined in claim 2 wherein said locking means comprises a tubular body mounted on said second section of said brace, a plate movably mounted on said body and having means defining an opening for receiving said first section, and compression spring means mounted on said body and biasing said plate towards a canted position for providing a one-way grip of said first section of said brace.

4. A camping trailer as defined in claim 2 wherein said supporting means connected to said body comprises a stabilizing support including a member having means defining an opening therein, said pivot means comprising a U-shaped bracket receiving said first section of said brace, pin means connecting said first section of said brace to said bracket, and a plug inserted within said second section of said brace and including a tip portion adapted to project into said opening within said member.

5. A camping trailer as defined in claim 1 wherein said retaining means comprise a spring clip mounted on the underneath surface of said bed and spaced from said pivot means in a direction generally parallel to the direction of movement of said bed and adapted to receive said brace.

6. A camping trailer or vehicle, comprising a body, at least one horizontally disposed bed mounted on said body for movement generally horizontally between retracted and extended positions relative to said body, at least one elongated brace including a first tubular section and a second tubular section in telescopic relation, means for releasably locking said sections together to support a longitudinally compressive force without collapsing, pivot means connecting said first section of said brace to said bed adjacent the outer edge portion thereof and providing for pivotable movement of said brace between a a retracted position extending generally parallel to said bed and a support position extending angularly in relation to said bed, and means for retaining said brace in said retracted position for conveniently storing said brace when said bed is moved to said retracted position.

References Cited

UNITED STATES PATENTS

| | | | |
|---|---|---|---|
| 1,386,943 | 8/1921 | Moore | 296—23.2 |
| 3,013,836 | 12/1961 | Groh | 296—23 |
| 3,288,520 | 11/1966 | Krutzikowsky | 52—66 |

PHILIP GOODMAN, Primary Examiner

U.S. Cl. X.R.

52—66; 296—27